United States Patent
Makhervaks et al.

(10) Patent No.: US 10,051,038 B2
(45) Date of Patent: Aug. 14, 2018

(54) SHARED SEND QUEUE

(75) Inventors: Vadim Makhervaks, Austin, TX (US); Robert O. Sharp, Round Rock, TX (US); Brian Hausauer, Austin, TX (US); Kenneth G. Keels, Austin, TX (US); Donald E. Wood, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 819 days.

(21) Appl. No.: 13/994,776

(22) PCT Filed: Dec. 23, 2011

(86) PCT No.: PCT/US2011/067239
§ 371 (c)(1),
(2), (4) Date: Apr. 9, 2014

(87) PCT Pub. No.: WO2013/095654
PCT Pub. Date: Jun. 27, 2013

(65) Prior Publication Data
US 2014/0310369 A1     Oct. 16, 2014

(51) Int. Cl.
*H04L 29/08* (2006.01)
*H04L 12/861* (2013.01)
(Continued)

(52) U.S. Cl.
CPC .............. *H04L 67/10* (2013.01); *G06F 13/14* (2013.01); *G06F 13/38* (2013.01); *G06F 13/385* (2013.01);
(Continued)

(58) Field of Classification Search
CPC ......... H04L 67/10; H04L 49/90; H04L 47/50; H04L 45/24; G06F 13/38; G06F 13/14; G06F 13/385
See application file for complete search history.

(56) References Cited

U.S. PATENT DOCUMENTS 5,166,930 A * 11/1992 Braff ...................... H04L 12/56
370/235
7,822,420 B1    10/2010 Schultz
(Continued)

FOREIGN PATENT DOCUMENTS

| CN | 000101350940 | 1/2009 |
|---|---|---|
| EP | 2056504 | 5/2009 |

(Continued)

OTHER PUBLICATIONS

International Preliminary Report on Patentability and Written Opinion received for PCT Patent Application No. PCT/US2011/067239, dated Jul. 3, 2014, 5 pages.
(Continued)

*Primary Examiner* — Abdulkader M Alriyashi
(74) *Attorney, Agent, or Firm* — Grossman, Tucker, Perreault & Pfleger, PLLC

(57) ABSTRACT

Generally, this disclosure relates to a shared send queue in a networked system. A method, apparatus and system are configured to support a plurality of reliable communication channels using a shared send queue. The reliable communication channels are configured to carry messages from a host to a plurality of destinations and to ensure completed order of messages is related to a transmission order.

18 Claims, 8 Drawing Sheets

(51) Int. Cl.
*H04L 12/863* (2013.01)
*H04L 12/707* (2013.01)
*G06F 13/14* (2006.01)
*G06F 13/38* (2006.01)

(52) U.S. Cl.
CPC .............. *H04L 45/24* (2013.01); *H04L 47/50* (2013.01); *H04L 49/90* (2013.01)

(56) References Cited

U.S. PATENT DOCUMENTS

| | | |
|---|---|---|
| 2004/0085984 A1 | 5/2004 | Elzur |
| 2004/0120332 A1 | 6/2004 | Hendel |
| 2004/0193811 A1 | 9/2004 | Chadalapaka et al. |
| 2004/0264475 A1* | 12/2004 | Kowalski ................ H04L 47/24 370/395.5 |
| 2010/0020693 A1 | 1/2010 | Thakur |

FOREIGN PATENT DOCUMENTS

| | | |
|---|---|---|
| WO | 2004036805 | 4/2004 |
| WO | 2013/095654 A1 | 6/2013 |

OTHER PUBLICATIONS

International Search Report and Written Opinion received for PCT Patent Application No. PCT/US2011/067239, dated Sep. 3, 2013, 10 Pages.

China Office Action and Search Report from related China Patent Application CN103999068A dated Feb. 19, 2016.

\* cited by examiner

SHARED SEND QUEUE

FIELD

The present disclosure relates to a shared send queue for networked systems.

BACKGROUND

In a networked system, one or more hosts (e.g., servers) may communicate with one or more destination devices (e.g. clients and/or other servers) over a network. Rules and data formats for communication over the network are typically defined by communication protocols. Examples of such protocols include Ethernet and Internet Protocol Suite (TCP/IP). Typically, network controller(s) in the host (source end-point) and a network controller in each destination device (destination end-point) manage transmission and reception of messages including control and/or data between the host and the destination devices over the network. Communication may be connectionless or may have reliable connectivity (confirmed error-free transmission and in-order delivery).

Reliable Connection (RC) is a transport mode that is configured to provide reliable connectivity between a host and a destination device. In a conventional system, an RC is typically established by allocating a queue pair (QP) on the host. In some protocols, the QP includes a host interface (send queue) and an entity configured to provide reliable service for the QP over the network using a reliability protocol. For example, the InfiniBand standard includes a reliability protocol. In another example, iWARP is configured to use TCP to provide reliability service. Reliable service is configured to provide error-free transfer and in-order delivery of messages between the host and destination.

Reliable service includes functions performed by both the host and destination devices configured to result in error-free transfer and in-order delivery of messages from the host to a destination device. The host is configured to transmit messages in the order that they were posted to the send queue, to identify and retransmit messages and/or packets that were not successfully received by the destination end-point and to complete in-order messages confirmed received by the destination. The destination end-point is configured to validate and process received messages and/or packets, to provide the host an indication about received and processed messages and to deliver received messages and/or packets in-order (delivery order corresponding to the transmission order)

In some situations, it may be desirable for an application running on a host processor to communicate with a plurality of destination devices. In a typical reliable connection configuration, one or more dedicated QPs would be allocated in the host and a reliable connection established for each destination device. A software intermediary may multiplex messages between the plurality of reliable connections (and associated destination devices). Such multiplexing by software can significantly increase communication processing overhead.

BRIEF DESCRIPTION OF DRAWINGS

Features and advantages of the claimed subject matter will be apparent from the following detailed description of embodiments consistent therewith, which description should be considered with reference to the accompanying drawings, wherein:

Figure 1:
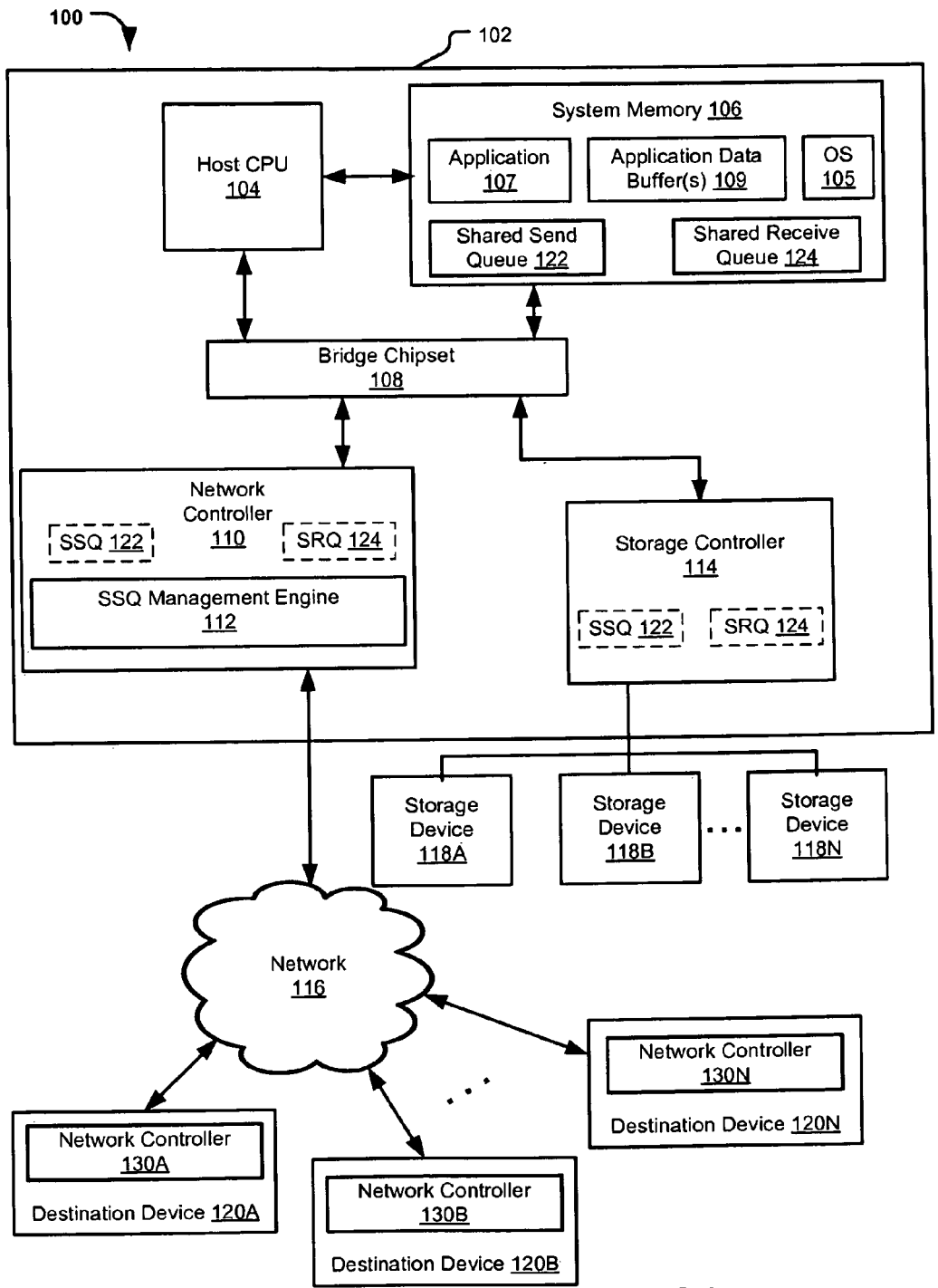
FIG. 1 illustrates one exemplary system embodiment consistent with the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure relates to a shared send queue in a networked system. A method and system are configured to support a plurality of reliable communication channels using the shared send queue. The shared send queue is configured to allow an application to communicate with a plurality of remote destinations over a plurality of reliable communication channels. Unlike a per reliable communication channel send queue, the shared send queue is "decoupled" from the reliable communication channels. A communication device such as a network controller is configured to manage the communication over the plurality of reliable communication channels.

The method and system are configured to allow a first plurality of outstanding messages to be associated with the shared send queue at a point in time. The method and system are further configured to allow a second plurality of outstanding messages to be associated with a reliable communication channel at a point in time. This is unlike some conventional systems that limit a send queue and a communication channel to one outstanding message at any point in time. Outstanding message as used herein corresponds to a message that has been transmitted but has not yet completed. In one embodiment, a completion order of work queue elements posted to the shared send queue corresponds to the transmission order of the messages corresponding to the work queue elements for the shared send queue. In another embodiment, the completion order of work queue elements posted to the shared send queue corresponds to the transmission order of the messages on a per reliable communication channel basis (i.e., independent of other reliable communication channels). In both embodiments, the transmission order is related to posting order of work queue elements to the shared send queue, as described herein.

As used herein, a reliable communication channel is a service (provided for example by a network controller) configured to provide reliable end-to-end connectivity between two end-points including error-free transfer of data between the end-points and in-order delivery of the data at the destination end-point. The reliable communication channels are configured to transfer messages from a host (source end-point) to a plurality of destinations (destination end-points) where each reliable communication channel is configured to provide reliable service between one pair of endpoints. The reliable communication channels are configured to ensure that the completion order of messages corresponds to a transmission order. "Completion" as used herein means that all message data was reliably transferred to the destination end-point and its reception has been confirmed (e.g., by an acknowledgement).

In a conventional system (i.e., single send queue per connection), an allocated QP is dedicated to one associated reliable connection between two end-points. Posting a work queue request to a specific send queue corresponds to a transport of messages using the associated reliable connection. In a method and system consistent with the present disclosure, the shared send queue is configured to be used with a plurality of reliable communication channels between a host (source end-point) and a plurality of destination end-points. A work queue element consistent with the present disclosure may include a descriptor configured to identify a reliable communication channel to be used to transport an associated message.

When an application has data to transmit, the application may post a work request. The work request may be translated into a work queue element (WQE) which is placed in a send queue (i.e., a work queue that is used to submit "work" to be transmitted). The order of WQEs in a send queue typically corresponds to the order in which the WQEs were submitted to the send queue and the order in which the associated messages may be transmitted.

Each WQE typically includes control information describing the message to be transmitted and a descriptor (data descriptor) identifying data to be transmitted (message payload) and its associated application buffer. In a conventional send queue, each send queue is associated with a respective reliable connection configured to provide reliable service so a specific reliable connection may not be identified in the WQE. A shared send queue consistent with the present disclosure may be associated with a plurality of reliable communication channels. Thus, a WQE posted to a shared send queue may include a descriptor (reliable communication channel descriptor) configured to associate the WQE with a reliable communication channel that should be used for transmitting the identified message (including payload).

Posting a WQE is configured to notify a communication device of the message (and data) to be sent. The communication device consistent with the present disclosure is configured to read the WQE posted to the shared send queue and to use the control information, data descriptor(s) and reliable communication channel descriptor to generate a protocol message. Messages may vary according to type, control information and payload. Communication protocols may restrict a packet size maximum packet size) that may be transmitted. If a message size exceeds the maximum packet size, the message may be segmented into a plurality of packets for transmission. The plurality of packets may then be reassembled into the original message at the destination. A WQE posted to the shared send queue may be completed after an entire associated message has been successfully transmitted and the message reception has been confirmed by the destination.

The communication device is configured to manage communication of completions to the application in message transmission order. In this manner, overhead associated with an operating system managing communication between an application and the plurality of destinations over the plurality of reliable communication channels may be avoided. Thus, a speed penalty associated with software may also be avoided. Advantageously, a companion device such as a storage controller may then communicate with the plurality of destinations over the plurality of reliable communication channels via a communication device consistent with the present disclosure without requiring a plurality of send queues (i.e., without requiring a send queue for each reliable communication channel). Thus, companion devices with limited queue storage capacity may communicate with a number of destinations where the number of dedicated send queues would exceed the queue storage capacity of the companion device.

FIG. 1 illustrates one exemplary system embodiment consistent with the present disclosure. System 100 generally includes a host system 102, a network 116, a plurality of storage devices 118A, 118B, . . . , 118N and a plurality of destination devices 120A, 120B, . . . , 120N. Each destination device 120A, 120B, . . . , 120N may include a respective network controller 130A, 130B, . . . , 130N configured to provide network 116 access to the destination device 120A, 120B, . . . , 120N. For example, the host system 102 may be configured to receive request(s) from one or more destination devices 120A, 120B, . . . , 120N for access to data stored in one or more storage devices 118A, 118B, . . . , 118N. The host system 102 may then be configured to provide the requested data to the one or more destination devices 120A, 120B, . . . , 120N over network 116.

The host system 102 generally includes a host processor, host CPU 104, a system memory 106, a bridge chipset 108, a network controller 110 and a storage controller 114. The host CPU 104 is coupled to the system memory 106 and the bridge chipset 108. In some embodiments, the bridge chipset may be included in host CPU 104. The bridge chipset 108 is coupled to the system memory 106, the network controller 110 and the storage controller 114. The storage controller 114 is coupled to the network controller 110 via the bridge chipset 108. The bridge chipset 108 may provide peer to peer connectivity between the storage controller 114 and the network controller 110. In some embodiments, the network controller 110 and the storage controller 114 may be integrated. The network controller 110 is configured to provide the host system 102 with network connectivity.

The network controller 110 (via SSQ management engine 112) is configured to manage transmission and reception of messages between the host 102 and destination devices 120A, 120B, . . . , 120N. The network controller 110 may be configured to provide reliable communication channels between the host 102 and the destination devices 120A, 120B, . . . , 120N. Network controller 110 may be configured to implement the reliable service. Examples of communication protocols configured to provide reliable service include but are not limited to, on Infiniband reliable connection protocol, iWARP (Internet Wide Area RDMA (Remote direct memory access) protocol) protocol or a TOE (TCP offload engine) protocol. These protocols are configured to provide reliable service with the network controller configured to provide transport layer services such as reliable packet delivery and in order message completion. Reliable packet delivery includes resending lost or corrupted packets and signaling an error if a number of retries are unsuccessful.

By using these protocols, the network controller 110 is configured to manage reliable communication channels without intervention of a host OS (operating system) and without copying transmitted (and received) data multiple times, while insuring completions are communicated to a sending application in order. In other words, by using these protocols, CPU overhead, memory bandwidth utilization, and latency are reduced by offloading transport layer processing from the CPU, eliminating unnecessary buffering and reducing OS calls and context switches. Further, implementation of a shared send queue consistent with the present disclosure does not require a change to a physical layer, facilitating communication with any standard protocol compliant communication device.

The system memory 106 is configured to store an operating system OS 105, an application 107 and one or more application data buffer(s). The system memory 106 is configured to store a shared send queue (SSQ) 122, as described herein. The system memory may be configured to store a shared receive queue (SRQ) 124. In an embodiment, the network controller 110 may be configured to store the shared send queue 122 and/or the shared receive queue 124. In another embodiment, the storage controller 114 may be configured to store the shared send queue 122 and/or the shared receive queue 124. In some embodiments, the storage controller 114 may be integrated with the network controller 110. The shared send queue 122 (and shared receive queue 124) may be used with a plurality of reliable communication channels, as described herein. The shared send queue 122 may be managed by an SSQ management engine 112. The SSQ management engine 112 may be included in the network controller 110. The shared receive queue 124 may be managed by the SSQ management engine 112 or a similar SRQ management engine.

The storage controller 114 is coupled to one or more storage devices 118A, 11813, . . . , 118N. The storage controller 114 is configured to store and retrieve data to/from the storage device(s) 118A, 118B, . . . , 118N. The data may be stored/retrieved in response to a request from destination device(s) 120A, 120B, . . . , 120N and/or an application running on host CPU 104.

Figure 2:
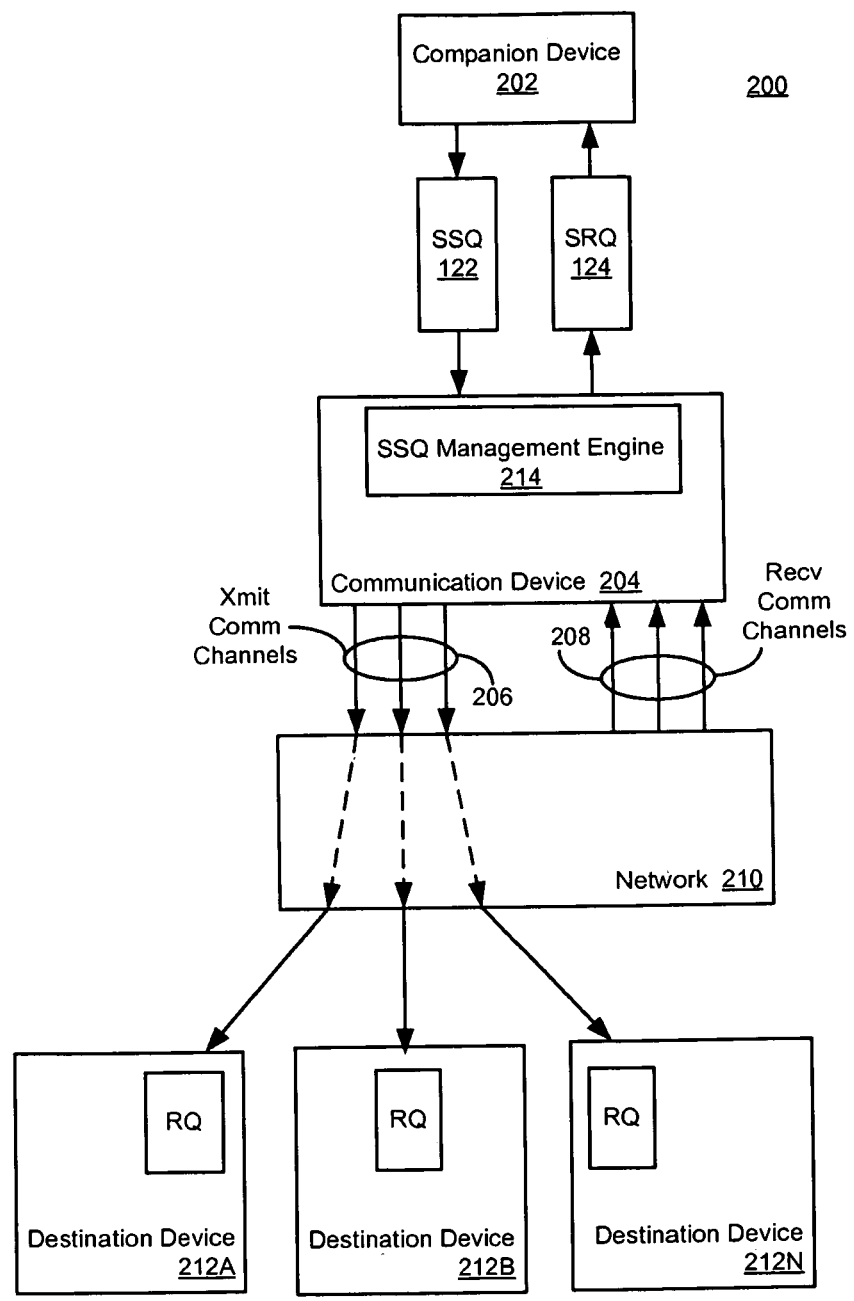
FIG. 2 illustrates an example of a communication subsystem including a shared send queue consistent with the present disclosure.

FIG. 2 illustrates an example of a communication subsystem 200 consistent with the present disclosure. The communication subsystem 200 includes the shared send queue 122 and the shared receive queue 124 of FIG. 1, a companion device 202, a communication device 204, a plurality of reliable transmit communication channels 206, a plurality of receive communication channels 208, a network 210 and a plurality of destination devices 212A, 212B, . . . , 212N. The communication device 204 includes a SSQ management engine 214. It should be noted that the arrows in the FIG. 2 indicated direction of data (message) transmission. Acknowledgements and the like may be transmitted on the same reliable communication channel in the opposite direction. Thus, the transmit reliable communication channels 206 and the receive communication channels 208 are bidirectional. For example, the companion device 202 may be a storage controller and the communication device 204 may be a network controller, as described herein. Continuing with this example, the SSQ 122 may be utilized to couple the storage controller 202 to a plurality of destination devices 212A, 212B, . . . , 212N via a plurality of reliable communication channels 206. Messages (that may include data) may then be transmitted from one or more storage devices to the destination devices 212A, 212B, . . . , 212N via the plurality of reliable communication channels 206 without requiring a plurality of send queues. The SSQ management engine 214 is configured to manage the shared send queue 122 such that message completions are provided in an order corresponding to the order of message transmission, as described herein. The SSQ management engine 214 may be configured to manage the shared receive queue 124.

Advantageously, implementation of a shared send queue consistent with the present disclosure does not limit a number of messages outstanding for a reliable communication channel (at a point in time), message size nor performed operation. Additionally or alternatively, the number of outstanding messages (at a point in time) for a shared send queue may only be limited by the capacity of the shared send queue. For example, a first plurality of outstanding messages may be associated with the shared send queue. In another example, a second plurality of outstanding messages may be associated with a reliable communication channel. This is unlike some conventional systems that limit a send queue and a communication channel to one outstanding message. For example, for an iWARP RDMA (Remote Direct Memory Access), all operations defined by the iWARP standard may be performed using a shared send queue consistent with the present disclosure. Use of the shared send queue and shared receive queue may allow a number of destination devices to exceed a number of interface queues of a companion device (e.g. storage controller) without requiring host OS (software) intervention. For example, for a storage controller companion device, the shared receive queue for a network controller may be mapped to a submission queue of the storage controller and a completion queue of the storage controller may be mapped to a shared send queue of the network controller. Thus, a plurality of destination devices may share the storage controller submission queues and completion queues while using dedicated reliable communication channels. This allows exposure of the storage controller to local and remote destinations without requiring support for a relatively large number of submission queues and completion queues by the storage controller.

Figure 3A:
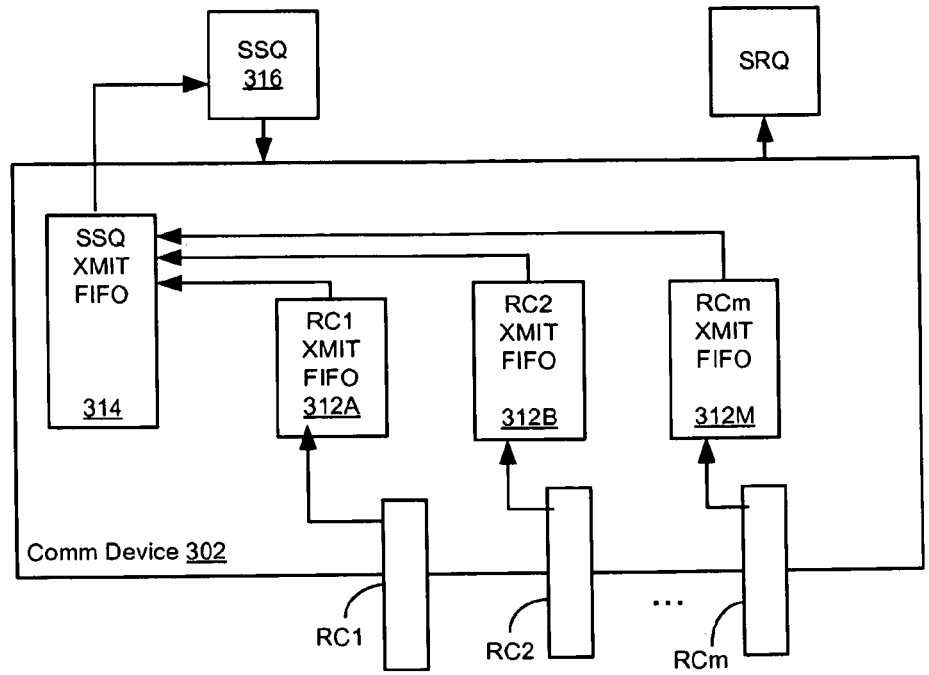
FIGS. 3A and 3B illustrate two exemplary embodiments of communication devices configured to manage a shared send queue used for transmitting a plurality of messages to a plurality of destinations over a plurality of reliable communication channels consistent with the present disclosure.
Figure 3B:
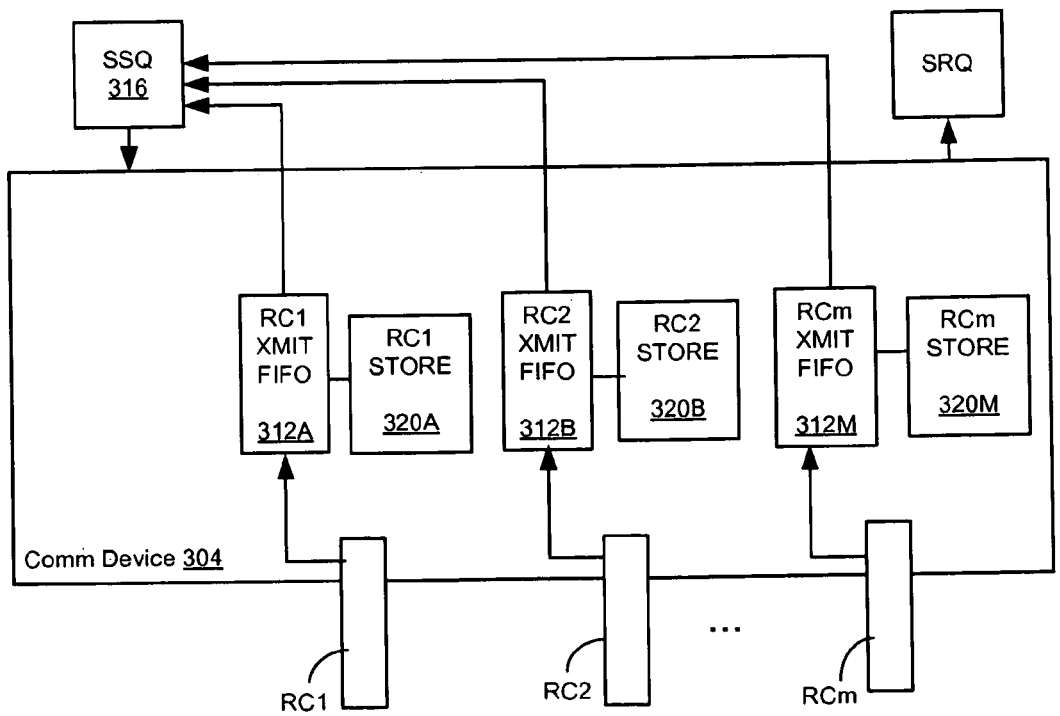

FIGS. 3A and 3B illustrate two exemplary embodiments 302, 304 of communication devices (e.g., network controller 110) configured to manage a shared send queue used by an application for transmission of messages over a plurality of reliable communication channels consistent with the present disclosure. Communication devices 302, 304 include a plurality of channel transmit history information stores (Xmit FIFOs) 312A, 312B, . . . , 312M where each channel transmit history information store is associated with a respective reliable communication channel RC1, RC2, . . . , RCm. For example, RC1 Xmit FIFO is associated with reliable communication channel RC1, RC2 Xmit FIFO is associated with reliable communication channel RC2, etc. Each reliable communication channel RC1, RC2, RCmis associated with a respective destination. Each reliable communication channel RC1, RC2, . . . , RCm corresponds to a reliable communication channel that has been established between the host and a respective destination device. Each channel transmit history information store 312A, 312B, ..., 312M is configured to ensure that a message transmitted via a respective reliable communication channel RC1, RC2, ..., RCm is completed in order for that reliable communication channel.

Each channel transmit history information store 312A, 312B, ..., 312M is configured to track messages that have been transmitted on the associated reliable communication channel but have not yet completed. The transmit history information stores 312A, 312B, ..., 312M are configured to store tracking information that is used to complete or retransmit outstanding messages. For example, RC1 Xmit FIFO 312A is configured to track messages transmitted on reliable communication channel RC1, RC2 Xmit FIFO 312B is configured to track messages transmitted on reliable communication channel RC2, etc. Each channel transmit history information store 312A, 312B, ..., 312M is further configured to ensure that messages complete in an order corresponding to the order they were transmitted on the associated reliable communication channel. For example, RC1 Xmit FIFO 312A is configured to ensure that messages transmitted on reliable communication channel RC1 complete in order corresponding to the order that they were transmitted.

Turning to FIG. 3A, in this embodiment communication device 302 further includes a SSQ transmit history information store (SSQ Xmit FIFO) 314. The SSQ Xmit FIFO 314 is coupled between the channel transmit history information stores 312A, 312B, ..., 312M and a shared send queue SSQ 316. Each entry in each channel transmit history information store 312A, 312B, ..., 312M may be associated with a respective entry in the SSQ transmit history information store 314. The SSQ transmit history information store 314 is configured to ensure that messages transmitted via the plurality of reliable communication channels RC1, RC2, ..., and RCm are completed in the order they were posted to the shared send queue 316.

Completion of a message corresponding to a respective channel transmit history information store 312A, 312B, ..., or 312M entry may not necessarily result in completion of the associated SSQ transmit history information store 314 entry. For example, channel transmit history information store entries for one reliable communication channel may be completed out of order with respect to channel transmit history information store entries for other reliable communication channels. In this embodiment, SSQ transmit history information store entries are configured to complete in order. In other words, an SSQ transmit history information store entry may only complete when preceding (in posting and/or transmission order) SSQ transmit history information store entries have completed. In order to achieve a completion order that corresponds to the posting order for entries in the SSQ 316, an SSQ transmit history information store entry may be marked Pending Completion when its associated channel transmit history information store entry completes. For example, marking may include setting a Pending Completion bit in the associated SSQ transmit history information store entry. The communication device 302 may be configured to monitor Pending Completion bits for each SSQ transmit history information store entry and to actually complete SSQ transmit history information store entries marked Pending Completion in a completion order corresponding to a work queue element posting order in the shared send queue 316. In this configuration, a number of messages outstanding (i.e. awaiting completion) for each reliable communication channel may be limited by a capacity of the SSQ 316, a maximum size of the SSQ transmit history information store 314 or a maximal size of an associated channel transmit history information store 312A, 312B, ..., 312M. Thus, the channel transmit history information stores 312A, 312B, ..., 312M and the SSQ transmit history information store 314 may be utilized with the shared send queue SSQ 316 to ensure completion of transmitted messages are communicated to the sending application in the order that they were posted to the shared send queue 316.

Turning now to FIG. 3B, in this embodiment the plurality of channel transmit history information stores 312A, 312B, ..., 312M may be coupled to the shared send queue 316. The communication device 304 may include a plurality of outstanding WQE stores 320A, 320B, ..., 320M where each outstanding WQE store is associated with a respective transmit history information store 312A, 312B, ..., 312M. The outstanding WQE stores 320A, 320B, ..., 320M are structures configured to store information related to WQEs that have been posted to the SSQ 316. For example, the information related to the WQE may include the entire WQE, a portion of the WQE, other information provided to the WQE and/or information corresponding to the WQE. The outstanding WQE stores 320A, 320B, ..., 320M may be extensions of the transmit history information stores 312A, 312B, ..., 312M. Each outstanding WQE store 320A, 320B, ..., or 320M may be managed as a part of an associated transmit history information store 312A, 312B, ..., or 312M, respectively, or may be managed separately. The transmit history information stores 312A, 312B, ..., 312M and outstanding WQE stores 320A, 320B, ..., 320M are configured to provide in-order message completion on a per reliable communication channel basis. In other words the completion order of WQEs posted to the SSQ 316 may be maintained for messages transmitted on a respective reliable communication channel RC1, RC2, ... or RCM. WQEs associated with the respective reliable communication channel may complete independent of whether WQEs associated with messages transmitted on other reliable communication channels have completed. The outstanding WQE stores 320A, 320B, ..., 320M are configured to allow associated WQEs in the SSQ 316 corresponding to other messages that transmitted prior to a respective message but have not yet completed to be released when the respective message completes thereby freeing up space in the SSQ 316 allowing posting of new work requests.

In this embodiment, at least a portion of each WQE may be copied to the respective channel transmit history information store 312A, 312B, ..., 312M (or outstanding WQE store 320A, 320B, ..., 320M referred to by the respective channel transmit history information store 312A, 312B, ..., 312M) associated with the reliable communication channel used for transmission of the message corresponding to the WQE. This copy of the at least a portion of the WQE is configured to allow retransmission of negatively acknowledged or unacknowledged and timed-out packets (and messages). This copy of the WQE is further configured to allow in-order release and/or out of order completions of WQEs posted to the SSQ.

The SSQ is configured to allow an application to send a plurality of messages to plurality of destination end-points using the SSQ (rather than a plurality of dedicated send queues). The SSQ is further configured to allow a plurality of outstanding messages (at any point in time). In some situations, the application may be configured so that the WQEs posted to the SSQ complete in transmission order for all of the reliable communication channels (and destination end-points) associated with the posted WQEs. In other situations, the application may be configured such that completion order between individual destination end-points is not important. In these other situations, it may be desirable to allow WQEs to complete out of order with respect to different destinations while maintaining in-order completion with respect to an individual destination. Allowing WQEs posted to the SSQ to complete out of order with respect to different destinations (and their associated reliable communication channels) may reduce inter-destination dependencies.

For example, a first message with art associated first destination and an associated first WQE posted to the SSQ prior to a second message with an associated second destination and an associated second WQE posted to the SSQ may be received, processed and confirmed by the first destination after the second message is received, processed and confirmed by the second destination. If completion order corresponding to transmission order for the entire SSQ is enforced, then the second WQE could not be completed before the first WQE completed, thus introducing a delay in completion of the second message dependent on performance of the first destination and first reliable communication channel. If completion order corresponding to transmission order is enforced only on a per reliable communication channel (and individual destination) basis, then the second WQE could complete before the first WQE completed. Thus, dependencies between individual destinations may be reduced.

The outstanding WQE stores 320A, 320B, . . . , 320M are configured to facilitate WQE completions when the completion order of the WQEs posted to the SSQ 316 corresponds to the transmission order of the messages on a per-reliable communication channel (and per destination end-point) basis (i.e., independent of other reliable communication channels and their associated destinations). When a WQE posted to the SSQ 316 is completed, it may be released allowing a new work request to be posted to the SSQ 316. When out of order completions with respect to different destinations are allowed, WQEs posted to the SSQ 316 prior to a newly completed WQE may not be completed. Storing a copy of at least a portion of the WQEs in the appropriate transmit history information stores 312A, 312B, . . . , 312M or outstanding WQE stores 320A, 320B, . . . , 320M allows a not yet completed prior posted WQE to be released from the SSQ 316. The copy of the WQE may then be used to ensure reliable service and an entry in the SSQ 316 corresponding to the released WQE may be reused. It should be noted that, although the WQE may be released from the SSQ 316 prior to completion, the associated data buffers may not be released until the WQE has been completed by the respective reliable communication channel (using the copy of the WQE).

A SSQ WQE may be completed upon completion of a corresponding channel transmit history information store 312A, 312B, . . . , 312M entry. In other words, unlike communication device 302, completion of a channel transmit history information store entry for a respective reliable communication channel may result in completion of the associated SSQ WQE for that reliable communication channel, without concern for completions of WQEs corresponding to messages transmitted on other reliable communication channels.

In operation, an application with data to transmit may post a work queue element (WQE) to the shared send queue 316. A plurality of WQEs may be posted to SSQ 316 by the application. Each WQE includes a descriptor configured to identify the respective data to be transmitted. For example, the descriptor may include a pointer to a location in system memory and a number of bytes of data to be transmitted. Each WQE posted to the SSQ includes a reliable communication channel designator configured to identify the reliable communication channel that should be used to transmit the message that corresponds to the WQE.

The communication device is then configured to transmit each message in the order that the WQEs were posted to the shared send queue. The channel transmit history information stores 312A, 312B, . . . , 312M are configured to receive acknowledgements of receipt of the transmitted messages by the destination devices. The messages may be transmitted as a sequence of packets. For reliable communication channels, each packet may be acknowledged and a transmission associated with a WQE may complete when all packets associated with a message (corresponding to the WQE) have been sent and receipt acknowledged by the destination device and all preceding WQEs targeting the same reliable communication channel have completed as well.

Figure 4A:
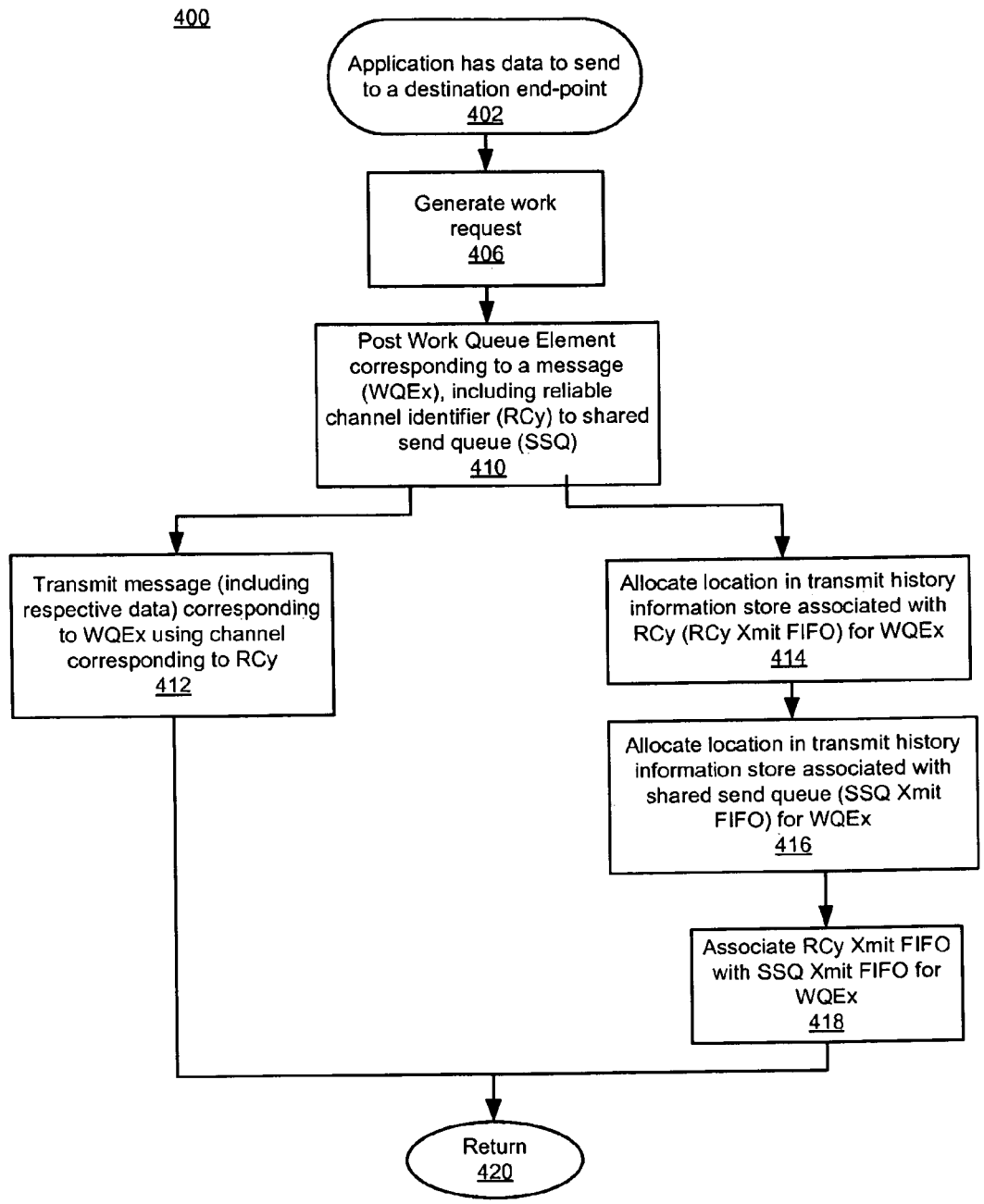
FIGS. 4A and 4B are exemplary flow charts illustrating operation of a host system and communication device for transmitting a plurality of messages to a plurality of destination devices over a plurality of reliable communication channels using a shared send queue and preserving transmission order for the shared send queue.
Figure 4B:
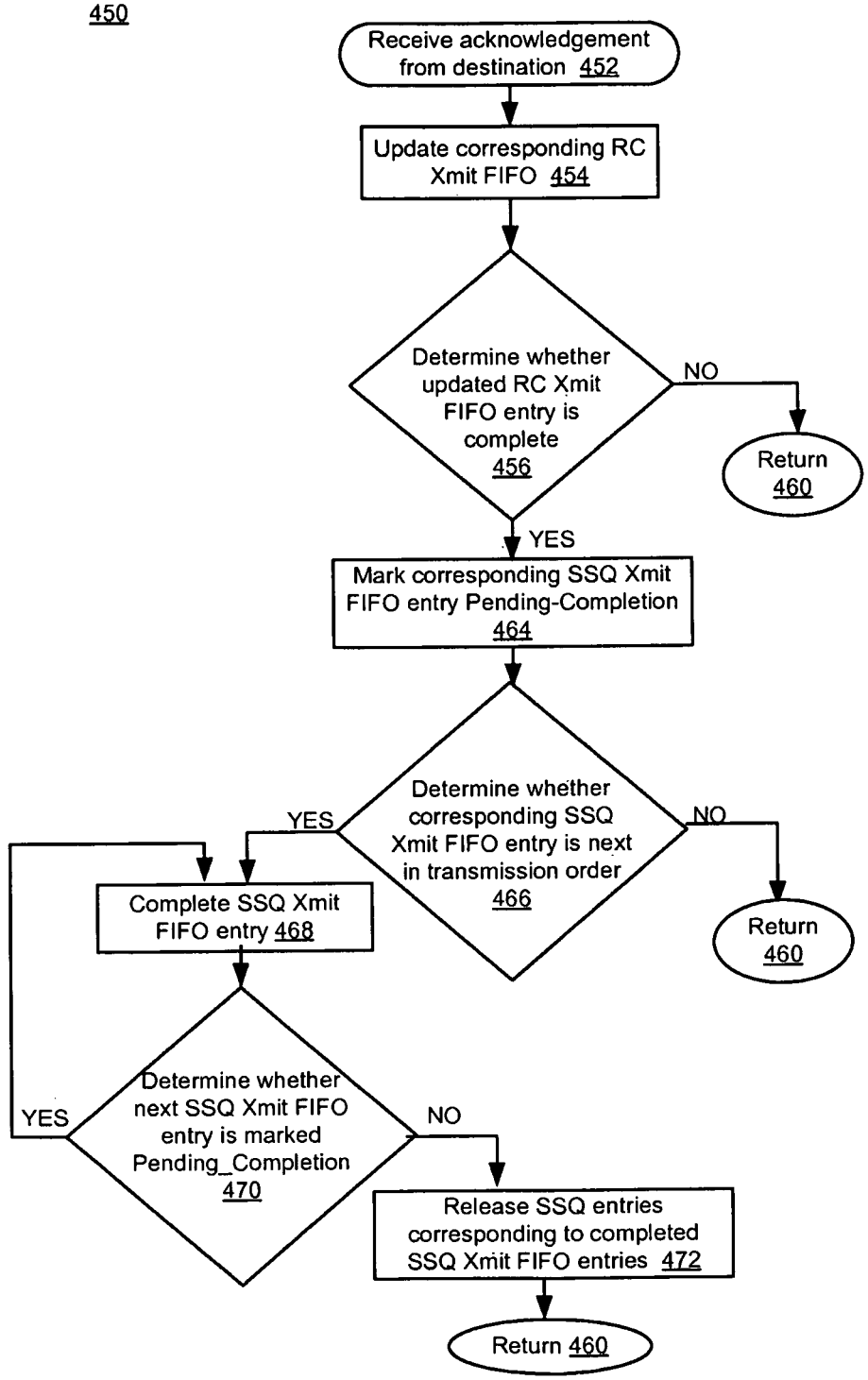

FIGS. 4A and 4B are flow charts illustrating operation of a host system and communication device (e.g. communication device 302) configured to transmit message(s) to a plurality of destination devices over a plurality of reliable communication channels using a shared send queue. The operations shown in FIGS. 4A and 413 are configured to preserve transmission order of messages corresponding to WQEs in the shared send queue for the shared send queue (rather than for one reliable communication channel). In other words, completion order corresponds to transmission order across the reliable communication channels.

The operations of FIGS. 4A and 4B may be performed by an application executing on a host system (e.g. host system 102), a communication device (e.g., network controller 110), a companion device (e.g., storage controller 114) or a combination thereof. Flow chart 400 begins when an application has data to send to a destination end-point 402. The application may generate a work request at operation 406. The work request may include control information describing message type and message attributes, descriptors that indicate a location in memory where data to be transmitted is stored, an amount of data to be transmitted, a designator corresponding to a reliable communication channel to be used for transmission and/or a designator indicating a destination device that is to receive the message.

Operation 410 may include posting a work queue element (WQEx) corresponding to the work request to shared send queue (SSQ). The work queue element may include a reliable communication channel identifier (RCy). The message corresponding to WQEx may be transmitted on the reliable communication channel corresponding to RCy at operation 412. A location in a transmit history information store associated with reliable communication channel RCy (e.g., RCyXmit FIFO) may be allocated for WQEx at operation 414. A location in a transmit history information store associated with the SSQ (e.g. SSQ Xmit FIFO) may be allocated for WQEx at operation 416. The transmit history information store for reliable communication channel RCy (i.e., RCyXmit FIFO) may be associated with the transmit history information store for the shared send queue (SSQ Xmit FIFO) at operation 418. The operations of flow chart 400 may end at return 420. Although shown in parallel, operation 412 may be performed before or in parallel with operations 414, 416, and 418. If operation 412 is performed in parallel with operations 414, 416 or 418, relative tinting of the operations may be constrained to ensure that the transmit history information store RCyXmit FIFO associated with the reliable communication channel RCy has been updated prior to transmission of the message to avoid a theoretically possible race condition where an acknowledgement for the transmitted message arrives prior to finishing updating the RCyXmit FIFO entry. The operations of flow chart 400 may be repeated whenever the application has data to send to a destination end-point. Thus, the SSQ may be utilized by the application to send a plurality of messages to a plurality of destination end-points where each message corresponds to respective associated data.

Flow chart 450 (FIG. 4B) begins when an acknowledgement is received 452 from a destination device. Operation 454 may include updating a corresponding communication channel transmit history information store (RC Xmit FIFO). For example, a positive acknowledgement may indicate that a sent packet has been received accurately by the destination device. If the packet is not accurately received or not received at all, a negative acknowledgement may be received from the destination device or a timeout may expire on the sending communication device, and the sending device may then resend the packet.

Operation 456 may include determining whether the updated RC Xmit FIFO entry is completed (i.e., the message associated with the updated RC Xmit FIFO entry has been successfully received and confirmed by the destination device). If the updated RC Xmit FIFO entry is not completed, program flow may return at operation 460. If the updated RC Xmit entry is completed, the corresponding entry in the shared send queue transmit history information store (SSQ Xmit FIFO) may be marked Pending Completion at operation 464.

For example, a message may be segmented into a sequence of packets for transmission from the host communication device to a destination device using reliable communication channel RCy. In order to ensure in-order completion of the transmitted packets (i.e., all packets confirmed received by the destination), the associated RC transmit history information store (e.g., RCyXmit FIFO) may be used to track acknowledgments. When all transmitted packets have been acknowledged received and all preceding messages on the same reliable communication channel have been completed, the message has completed and the corresponding entry in the SSQ Xmit FIFO may be marked Pending Completion.

Operation 466 may include determining whether the corresponding SSQ Xmit FIFO entry is next in transmission order (i.e., is a first non-completed WQE in the SSQ). If the corresponding SSQ Xmit FIFO entry is not next in transmission order, program flow may return at operation 460. If the corresponding SSQ Xmit FIFO entry is next in transmission order, the corresponding SSQ Xmit FIFO entry may complete at operation 468.

Operation 470 may include determining whether a next SSQ Xmit FIFO entry is marked Pending Completion at operation 470. If the next SSQ Xmit FIFO entry is marked Pending Completion, program flow may proceed to operation 468 and the next SSQ Xmit FIFO entry may be completed. If the next SSQ Xmit FIFO entry is not marked Pending Completion, shared send queue entries corresponding to completed SSQ Xmit FIFO entries may be released at operation 472 (and then completion may be reported to the application, e.g., using mechanisms defined by a host interface). Program flow may then return at operation 460.

The operations of flow chart 450 are configured to ensure that transmitted messages complete in the order that their associated work queue elements were posted to the shared send queue (and thus transmitted). Each work queue element is configured to designate the reliable communication channel to be used for transmitting the associated message. Thus, completions are communicated to the requesting application in the order that the WQEs were posted to the SSQ regardless of the order of completion of WQEs between there liable communication channels.

Figure 5A:
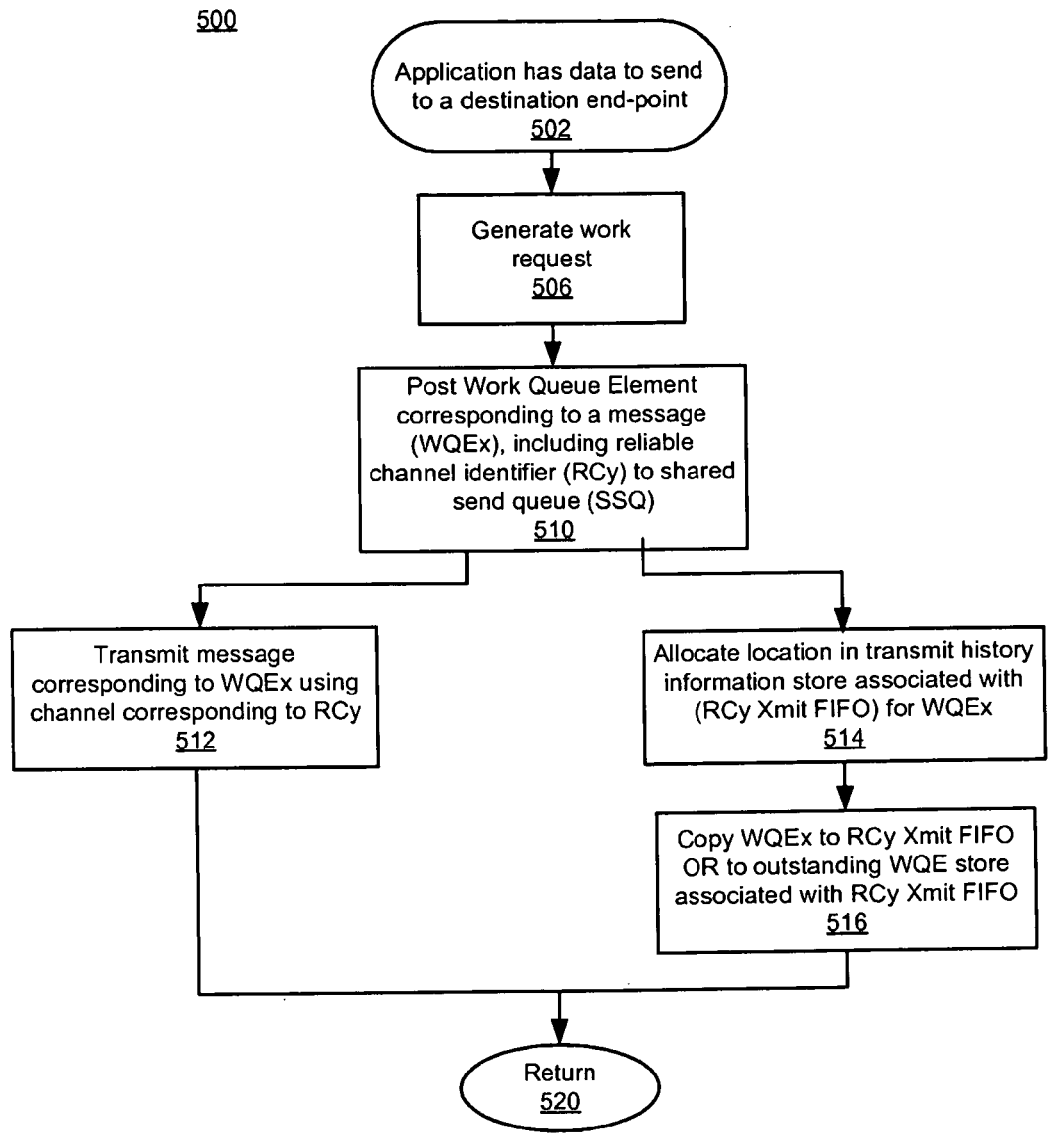
FIGS. 5A and 5B are more exemplary flow charts illustrating operations of a host system and communication device for transmitting a plurality of messages to a plurality of destination devices over a plurality of reliable communication channels using a shared send queue and preserving transmission order for each reliable communication channel.
Figure 5B:
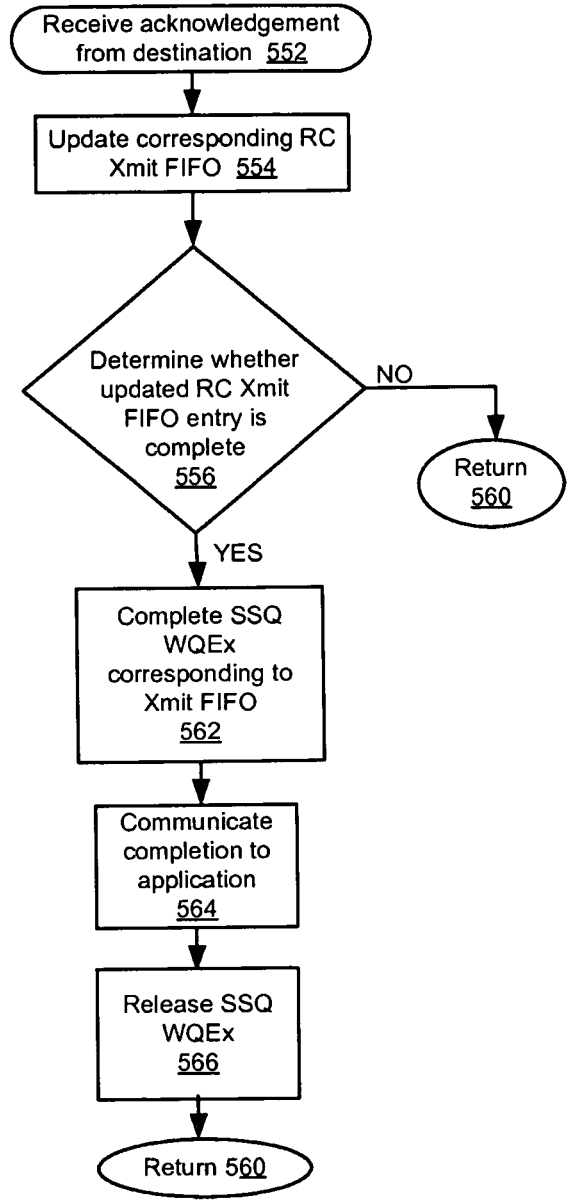

FIGS. 5A and 5B are flow charts 500, 550 illustrating operations of a host system and communication device (e.g., communication device 304) configured to transmit messages to a plurality of destination devices over a plurality of reliable communication channels. The operations shown in FIGS. 5A and 5B are configured to preserve transmission order per reliable communication channel for messages corresponding to WQEs posted to the shared send queue. In other words, completions are communicated to the application for each reliable communication channel in the order that the WQEs were posted to the shared send queue for that reliable communication channel independent of completions for messages transmitted via other reliable communication channels.

The operations of FIGS. 5A and 5B may be performed by an application executing on a host system (e.g. host system 102), a communication device (e.g. network controller 110), a companion device (e.g. storage controller 114) or a combination thereof. Flow chart 500 begins when an application has data to send to a destination end-point 502. The application may generate a work request at operation 506. The work request may include control information describing message type and message attributes, descriptors that indicate a location in memory where data to be transmitted is stored, an amount of data to be transmitted, a designator corresponding to a reliable communication channel to be used for transmission and/or a designator indicating a destination device that is to receive the message.

Operation 510 may include posting a work queue element (WQEx) corresponding to the work request to a shared send queue (SSQ). The WQEx may include a reliable communication channel identifier (RCy). The message corresponding to WQEx may be transmitted via the reliable communication channel corresponding to RCy at operation 512. A location in a transmit history information store associated with reliable communication channel RCy (e.g., RCyXmit FIFO) may be allocated for WQEx at operation 514. Operation 516 includes copying the at least a portion of the work queue element WQEx from the SSQ to the associated transmit history information store RCyXmit FIFO or to a structure (e.g., outstanding WQE store (RCy STORE)) associated with the transmit history information store RCyXmit FIFO. The copy of the work queue element may be utilized for completion and retransmission of one or more packet(s) of the message (e.g., if a negative acknowledgement is received from the destination device or no acknowledgement is received and a time-out occurs on the communication device). The operations of flow chart 500 may end at return 520. Although shown in parallel, operation 512 may be performed before or in parallel with operations 514 and 516 (with a similar constraint as described with respect to FIG. 4A).

Flow chart 550 (FIG. 5B) begins when an acknowledgement is received 552 from a destination device. Operation 554 may include updating a corresponding communication channel transmit history information store (RC Xmit FIFO). For example, a positive acknowledgement may indicate that a sent packet has been received accurately by the destination device. If the packet is not accurately received, a negative acknowledgement may be transmitted from the destination device or a time-out may expire on the sending communication device, and the sending device may then resend the packet.

Operation 556 may include determining whether the updated RC Xmit FIFO entry is complete. If the updated RC Xmit FIFO entry is not complete, program flow may return at operation 560. If the updated RC Xmit entry is complete, the shared send queue work queue entry corresponding to the RC Xmit entry may be completed at operation 562. The completion may be communicated to the application at operation 564. The shared send queue work queue entry may include sufficient information to allow identification of the message and the associated application buffer so that it may be released upon the shared send queue work queue entry completion. The corresponding work queue entry in the shared send queue may be released at operation 566. The released corresponding work queue entry may then be reused to post another work request. Program flow may then return at operation 520.

The operations of flow chart 550 are configured to ensure that transmitted messages complete in the order that their associated work queue elements were posted to the shared send queue for each reliable communication channel independent of completion of messages transmitted on other reliable communication channels. Advantageously, in this embodiment, relatively faster reliable communication channels (and destination devices) may complete their transmissions without being limited by slower reliable communication channels (and destination devices) that are sharing the shared send queue.

Figure 6:
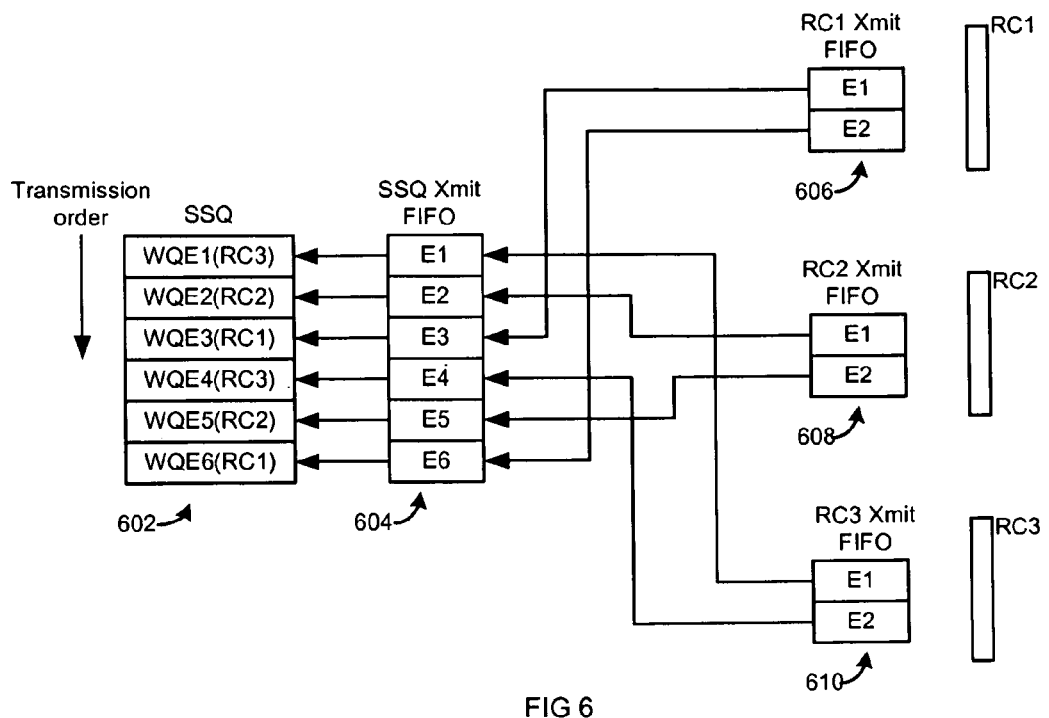
FIG. 6 is an example illustrating entries in a shared send queue and entries in transmit history information stores for the shared send queue for a plurality of reliable communication channels for the embodiment illustrated in FIG. 3A consistent with the present disclosure.
Figure 7:
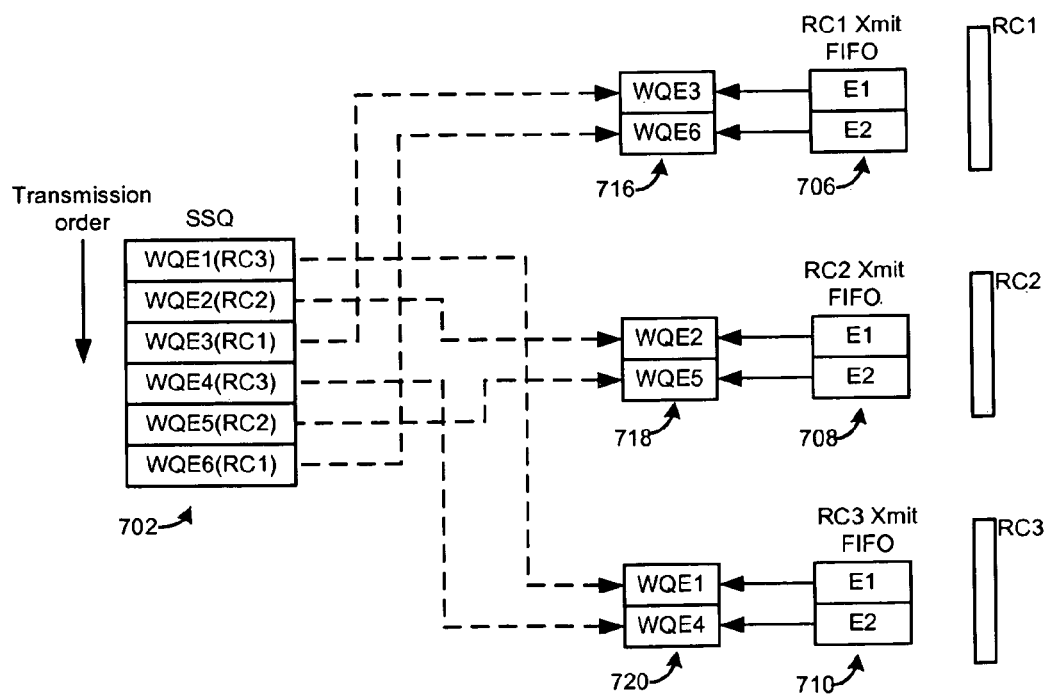
FIG. 7 is an example illustrating entries in a shared send queue and entries in transmit history information stores for the shared send queue for a plurality of reliable communication channels for the embodiment illustrated in FIG. 3B consistent with the present disclosure.

FIGS. 6 and 7 are two examples illustrating entries in the shared send queue, entries in transmit history information stores for the shared send queue and a plurality of reliable communication channels. The example in FIG. 6 corresponds to the embodiment where completion order corresponds to work queue element posting order in the shared send queue. The example in FIG. 7 corresponds to the embodiment where completion order corresponds to work queue element posting order to the shared send queue for a respective reliable communication channel.

Turning now to FIG. 6, work queue elements (WQEx, where x=1, 2, . . . , 6) are posted to a shared send queue 602 in order WQE1 first, then WQE2, . . . , then WQE6. The posting order corresponds to the transmission order of messages associated with the WQEs. In this example, each work queue element is associated with one of three reliable communication channels (RC1, RC2, RC3), e.g., WQE1-RC3, WQE2-RC2, WQE3-RC1, etc. Upon transmission of the message associated with each WQE, each WQE is allocated an entry in SSQ XMIT FIFO 604 (the SSQ transmit history information store) and an entry in the channel transmit history information store (RCy (y=1, 2 or 3) XMIT FIFO) of the associated reliable communication channel, WQE1 has been allocated entry E1 in the SSQ Xmit FIFO 604 and entry E1 in RC3 Xmit FIFO 610. WQE2 has been allocated entry E2 in the SSQ Xmit FIFO 604 and entry E1 in RC2 Xmit FIFO 608. WQE3 has been allocated entry E3 in the SSQ Xmit FIFO 604 and entry E1 in RC1 Xmit FIFO 606 and so on. In this example, as messages complete, entries in the communication channel transmit history information stores RCyXmit FIFOs 606, 608, 610 may be updated. As the RCyXmit FIFOs 606, 608, 610 complete, corresponding entries in the SSQ Xmit FIFO 604 may be marked PendingCompletion, as described herein. In this example all WQEs are completed in the order they have been posted to the SSQ 602, and in the order they were transmitted from the SSQ 602. WQE1 is completed first, then WQE2, WQE3, etc. In this manner, completions are communicated according to the order that WQEs were posted to the shared send queue 602 for all of the reliable communication channels.

Turning to FIG. 7, work queue elements (WQEx) are posted to the shared send queue 702 in order WQE1, WQE2, . . . , WQE6. Each work queue element is associated with one of three reliable communication channels RC1, RC2, RC3. The transmission order of messages corresponding to WQEs in SSQ 702 is indicated by the "Transmission Order". WQEs are transmitted in the order they have been posted to SSQ. WQE1 is transmitted first, then WQE2, etc. Each WQEx is associated with particular reliable communication channel RC1, RC2 or RC3 (e.g. WQE1-RC3, WQE2-RC2, WQE3-RC1, etc.). Upon transmission each WQEx is allocated an entry in the RCyXmit FIFO of its associated reliable communication channel and at least a portion of the WQE is copied either to the allocated RCyX-MIT FIFO entry, or to the new structure referred to by the RCyXmit FIFO entry (i.e., outstanding WQE store 716, 718, 720). In this example, WQE1 has been allocated entry E1 in RC3 Xmit FIFO 710, WQE2 has been allocated E1 in RC2 Xmit FIFO 708, WQE3 has been allocated entry E1 in RC1 Xmit FIFO 706 and so on. The dotted lines in FIG. 7 correspond to copying at least a portion of each WQE from the SSQ 702 to the respective outstanding WQE store 716, 718, 720.

WQEs may be completed in an order different from the WQE (i.e., message) transmission order. Messages transmitted on RC1 (WQE3 and WQE6) are completed first, then messages transmitted on RC2 (WQE2 and WQE5) are completed, and last messages transmitted on RC1 (WQE1 and WQE4) are completed. All WQEs were completed in order for their associated reliable communication channel. The completion order in terms of work queue element in the SSQ 702 is: WQE3, WQE6, WQE2, WQE5, WQE1 and WQE4. Retransmission, if necessary, may utilize the at least a portion of each work queue element that has been copied to outstanding WQE stores 716, 718, 720, as described herein. Completions are communicated to the requesting application according to the WQE posting order to the share send queue 702 for each reliable communication channel.

A method, apparatus and system configured to support a plurality of reliable communication channels using a shared send queue has been described. The shared send queue is configured to allow an application to communicate with a plurality of destinations over a plurality of reliable communication channels. A communication device such as a network controller is configured to manage the communication over the plurality of reliable communication channels. The method, apparatus and system are configured to allow a first plurality of outstanding messages to be associated with the shared send queue at a point in time. The method, apparatus and system are further configured to allow a second plurality of outstanding messages to be associated with a reliable communication channel. This is unlike some conventional systems that limit a send queue and a communication channel to one outstanding message. In one embodiment, a completion order of work queue elements posted to the shared send queue corresponds to the transmission order of the messages corresponding to the work queue elements for the shared send queue. In another embodiment, the completion order of work queue elements posted to the shared send queue corresponds to the transmission order of the messages on a per reliable communication channel basis (i.e., independent of other reliable communication channels). In both embodiments, the transmission order corresponds to posting order of work queue elements to the shared send queue.

While the foregoing is prided as exemplary system architectures and methodologies, modifications to the present disclosure are possible. For example, an operating system 105 in host system memory may manage system resources and control tasks that are run on, e.g., host system 102. For example, OS 105 may be implemented using Microsoft Windows, HP-UX, Linux, or UNIX, although other operating systems may be used. In one embodiment, OS 105 shown in FIG. 1 may be replaced by a virtual machine manager which may provide a layer of abstraction for underlying hardware to various operating systems running on one or more processing units.

Operating system 105 may implement one or more protocol stacks. A protocol stack may execute one or more programs to process packets. An example of a protocol stack is a TCP/IP (Transport Control Protocol/Internet Protocol) protocol stack comprising one or more programs for handling (e.g., processing or generating) packets to transmit and/or receive over a network. A protocol stack may alternatively be comprised on a dedicated sub-system such as, for example, a TCP offload engine and/or network controller 110.

Other modifications are possible. For example, system memory, e.g., system memory 106 and/or memory associated with the network controller, e.g., network controller 110, may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory 106 and/or memory associated with network controller 110 may comprise other and/or later-developed types of computer-readable memory.

Embodiments of the methods described herein may be implemented in a system that includes one or more storage mediums having stored thereon, individually or in combination, instructions that when executed by one or more processors perform the methods. Here, the processor may include, for example, a processing unit and/or programmable circuitry in the network controller. Thus, it is intended that operations according to the methods described herein may be distributed across a plurality of physical devices, such as processing structures at several different physical locations. The storage medium may include any type of tangible medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

The Ethernet communications protocol, described herein, may be capable of permitting communication using a Transmission Control Protocol/Internet Protocol (TCP/IP). The Ethernet protocol may comply or be compatible with the Ethernet standard published by the institute of Electrical and Electronics Engineers (IEEE) titled "IEEE 802.3 Standard", published in March, 2002 and/or later versions of this standard.

The InfiniBand™ communications protocol, described herein, may be capable of permitting establishment and use of reliable communications with in order message completion. The InfiniBand™ protocol may comply or be compatible with the InfiniBand specification published by the InfiniBand Trade Association (IBTA), titled "InfiniBand Architecture Specification, Volume 1, Release 1.2.1", published in June, 2001, and/or later versions of this specification.

The iWARP communications protocol, described herein, may be capable of permitting establishment and use of reliable communications with in order message completion. The iWARP protocol may comply or be compatible with the iWARP standard developed by the RDMA Consortium and maintained and published by the Internet Engineering Task Force (IETF), "RDMA over Transmission Control Protocol (TCP) standard", published in 2007 and/or later versions of this standard.

"Circuitry", as used in any embodiment herein, may comprise, for example, singly or in any combination, hard-wired circuitry, programmable circuitry, state machine circuitry, and/or firmware that stores instructions executed by programmable circuitry.

In one aspect there is provided a method. The method includes posting a plurality of work queue elements to a shared send queue in a posting order, each work queue element comprising a descriptor configured to identify respective data to be transmitted and a communication channel designator configured to identify a communication channel to be used for transmitting the data; transmitting a message corresponding to each work queue element using the identified communication channel, the message comprising the respective data to be transmitted, wherein the messages are transmitted in a transmission order corresponding to the posting order of the work queue elements; and completing the work queue elements in the shared send queue in a completion order, the completion order related to the posting order.

In another aspect there is provided a communication system. The communication system includes a shared send queue configured to store a plurality of work queue elements wherein the work queue elements are posted to the shared send queue in a posting order, each work queue element comprising a descriptor configured to identify respective data to be transmitted and a communication channel designator configured to identify a communication channel to be used for transmitting the data a communication device configured to transmit a message corresponding to each work queue element using the identified communication channel, the message comprising the respective data to be transmitted, wherein the messages are transmitted in a transmission order corresponding to the posting order of the work queue elements; and the communication device is configured to complete the work queue elements in the shared send queue in a completion order, the completion order related to the posting order.

In another aspect there is provided a system. The system includes one or more storage mediums having stored thereon, individually or in combination, instructions that when executed by one or more processors, results in the following: posting a plurality of work queue elements to a shared send queue in a posting order, each work queue element comprising a descriptor configured to identify respective data to be transmitted and a communication channel designator configured to identify a communication channel to be used for transmitting the data; transmitting a message corresponding to each work queue element using the identified communication channel, the message comprising the respective data to be transmitted, wherein the messages are transmitted in a transmission order corresponding to the posting order of the work queue elements;

and completing the work queue elements in the shared send queue in a completion order, the completion order related to the posting order.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A method comprising:
posting a plurality of work queue elements to a shared send queue in a posting order, wherein the shared send queue is configured to be used with a plurality of reliable communication channels configured to confirm error-free transmission and in-order message delivery between a host computer and one or more destination devices, each work queue element comprising a descriptor configured to identify respective data to be transmitted and a communication channel designator configured to identify a communication channel to be used for transmitting the respective data;
transmitting a message corresponding to each work queue element from the shared send queue to a destination device using the communication channel identified by the communication channel designator in the corresponding work queue element, the message comprising the respective data to be transmitted, wherein the message corresponding to each work queue element is transmitted in a transmission order corresponding to the posting order of the work queue elements;
receiving an acknowledgment for each transmission; and
completing, based on receiving the acknowledgement, the work queue elements in the shared send queue in a completion order, the completion order related to the posting order.

2. The method of claim 1 wherein the completion order is the same as the posting order for the plurality of work queue elements posted to the shared send queue.

3. The method of claim 2, the host computer further comprising a communication channel transmit history information store and a shared send queue transmit history information store, the method further comprising:
allocating a location in the respective communication channel transmit history information store and a location in a shared send queue transmit history information store for each transmitted message; and
associating the location in the respective communication channel transmit history information store with the location in the shared send queue transmit history information store for each transmitted message,
wherein the respective communication channel transmit history information store is configured to ensure completion order is the same as the posting order for messages transmitted on the respective communication channel and the shared send queue transmit history information store is configured to ensure the completion order is the same as the posting order for the plurality of work queue elements.

4. The method of claim 3 further comprising:
allocating a location in a respective communication channel transmit history information store for each transmitted message; and
copying at least a portion of a respective work queue element to the allocated location in the respective communication channel transmit history information store,
wherein the respective communication channel transmit history information store is configured to ensure completion order is the same as the posting order for messages transmitted on the respective communication channel and the copied work queue element is configured to allow release of selected not yet completed work queue elements from the shared send queue.

5. The method of claim 1 wherein the completion order is the same as the posting order for work queue elements having a same communication channel designator.

6. The method of claim 1 wherein at least one of the shared send queue and the communication channel identified by the communication channel designator in the corresponding work queue element is configured to allow a plurality of outstanding messages at a point in time.

7. A communication system comprising at least a shared send queue and a processor wherein:
the shared send queue is configured to store a plurality of work queue elements;
the shared queue is further configured to be used with a plurality of reliable communication channels that are configured to confirm error-free transmission and in-order message delivery between the communication system and one or more destination devices;
the work queue elements are posted to the shared send queue in a posting order;
each work queue element comprising a descriptor configured to identify respective data to be transmitted and a communication channel designator configured to identify a reliable communication channel to be used for transmitting the respective data;
wherein a message corresponding to each work queue element is transmitted from the shared send queue to a destination device using the communication channel identified by the communication channel designator in the corresponding work queue element, the message comprising the respective data to be transmitted, wherein the message corresponding to each work queue element is transmitted in a transmission order corresponding to the posting order of the work queue elements; and
wherein an acknowledgement to each transmission is received and based on receiving the acknowledgement, the work queue elements in the shared send queue are completed in a completion order, the completion order related to the posting order.

8. The communication system of claim 7 wherein the completion order is the same as the posting order for the plurality of work queue elements posted to the shared send queue.

9. The communication system of claim 8, wherein the processor is further configured to:
allocate a location in a respective communication channel transmit history information store and a location in a shared send queue transmit history information store for each transmitted message; and associate the location in the respective communication channel transmit history information store with the location in the shared send queue transmit history information store, wherein the respective communication channel transmit history information store is configured to ensure completion order is the same as the posting order for messages transmitted on the respective communication channel and the shared send queue transmit history information store is configured to ensure the completion order is the same as the posting order the plurality of work queue elements.

10. The communication system of claim 7 wherein the completion order is the same as the posting order for work queue elements having a same communication channel designator.

11. The communication system of claim 10 wherein the processor is further configured to:
allocate a location in a respective communication channel transmit history information store for each transmitted message; and
copy at least a portion of a respective work queue element to the allocated location in the respective communication channel transmit history information store,
wherein the respective communication channel transmit history information store is configured to ensure completion order is the same as the posting order for messages transmitted on the respective communication channel and the copied work queue element is configured to allow release of selected not yet completed work queue elements from the shared send queue.

12. The communication system of claim 7 wherein at least one of the shared send queue and the communication channel identified by the communication channel designator in the corresponding work queue element is configured to allow a plurality of outstanding messages at a point in time.

13. A non-transitory computer readable medium comprising instructions encoded in said non-transitory computer readable medium, the instructions comprising a series of computer readable program operations that, when executed by one or more processors, are to perform:
posting a plurality of work queue elements to a shared send queue in a posting order, wherein the shared send queue is configured to be used with a plurality of reliable communication channels configured to confirm error-free transmission and in-order message delivery between a host computer and one or more destination devices, each work queue element comprising a descriptor configured to identify respective data to be transmitted and a communication channel designator configured to identify a communication channel to be used for transmitting the data;
transmitting from the shared send queue to a destination device a message corresponding to each work queue element using the communication channel identified by the communication channel designator in the corresponding work queue element, the message comprising the respective data to be transmitted, wherein the message corresponding to each work queue element is transmitted in a transmission order corresponding to the posting order of the work queue elements; and
receiving an acknowledgment to each transmission;
completing, based on receiving the acknowledgement, the work queue elements in the shared send queue in a completion order, the completion order related to the posting order.

14. The non-transitory computer readable medium of claim 13 wherein the completion order is the same as the posting order for the plurality of work queue elements posted to the shared send queue.

15. The non-transitory computer readable medium of claim 14 wherein the instructions that when executed by the one or more processors results in the following additional operations comprising:
allocating a location in a respective communication channel transmit history information store and a location in a shared send queue transmit history information store for each transmitted message; and
associating the location in the respective communication channel transmit history information store with the location in the shared send queue transmit history information store for each transmitted message,
wherein the respective communication channel transmit history information store is configured to ensure completion order is the same as the posting order for messages transmitted on the respective communication channel and the shared send queue transmit history information store is configured to ensure the completion order is the same as the posting order for the plurality of work queue elements.

16. The non-transitory computer readable medium of claim 13 wherein the completion order is the same as the posting order for work queue elements having a same communication channel designator.

17. The non-transitory computer readable medium of claim 16 wherein the instructions that when executed by the one or more processors results in the following additional operations comprising:
allocating a location in a respective communication channel transmit history information store for each transmitted message; and
copying at least a portion of a respective work queue element to the allocated location in the respective communication channel transmit history information store,
wherein the respective communication channel transmit history information store is configured to ensure completion order is the same as the posting order for messages transmitted on the respective communication channel and the copied work queue element is configured to allow release of selected not yet completed work queue elements from the shared send queue.

18. The non-transitory computer readable medium of claim 13 wherein at least one of the shared send queue and the communication channel identified by the communication channel designator in the corresponding work queue element is configured to allow a plurality of outstanding messages at a point in time.

* * * * *